United States Patent
Cheng et al.

(10) Patent No.: US 10,237,471 B2
(45) Date of Patent: Mar. 19, 2019

(54) CAMERA DEVICE AND AUTO-FOCUSING METHOD OF VARYING FOCAL LENGTH ACCORDING TO TIME VARIATION

(71) Applicant: VIVOTEK INC., New Taipei (TW)

(72) Inventors: Chung-Cheng Cheng, New Taipei (TW); Kuo-Yeh Hsieh, New Taipei (TW)

(73) Assignee: VIVOTEK INC., New Taipei (TW)

( * ) Notice: Subject to any disclaimer, the term of this patent is extended or adjusted under 35 U.S.C. 154(b) by 43 days.

(21) Appl. No.: 15/717,892

(22) Filed: Sep. 27, 2017

(65) Prior Publication Data

US 2018/0097987 A1    Apr. 5, 2018

(30) Foreign Application Priority Data

Sep. 30, 2016  (TW) .............................. 105131508 A

(51) Int. Cl.
| | |
|---|---|
| *H04N 5/232* | (2006.01) |
| *H04N 5/357* | (2011.01) |
| *H04N 5/376* | (2011.01) |
| *G06K 9/20* | (2006.01) |

(52) U.S. Cl.
CPC ....... *H04N 5/23212* (2013.01); *H04N 5/3575* (2013.01); *H04N 5/3765* (2013.01); *G06K 9/2054* (2013.01); *G06K 2209/15* (2013.01)

(58) Field of Classification Search
CPC .................... H04N 5/23212–5/232133; G06K 9/325–9/3266; G06K 2209/15
See application file for complete search history.

(56) References Cited

U.S. PATENT DOCUMENTS

2005/0280733 A1* 12/2005 Imaizumi ........... H04N 5/23212
                                                            348/345

* cited by examiner

*Primary Examiner* — Paul M Berardesca
(74) *Attorney, Agent, or Firm* — Winston Hsu

(57) ABSTRACT

An auto-focusing method capable of varying focal length of a lens of an camera device according to time variation is applied to the camera device with the lens. The auto-focusing method includes dividing a capturing period of the camera device into a plurality of time intervals, generating a plurality of sampling values within each time interval by several focusing process, utilizing the plurality of sampling values to calculate an estimation value relative to the each time interval, and driving the camera device to adjust the focal length of the lens of an camera device in accordance with capturing time of the camera device and the estimation values of the plurality of time intervals.

20 Claims, 5 Drawing Sheets

CAMERA DEVICE AND AUTO-FOCUSING METHOD OF VARYING FOCAL LENGTH ACCORDING TO TIME VARIATION

BACKGROUND OF THE INVENTION

1. Field of the Invention

The present invention relates to a camera device and a related focusing method, and more particularly, to a camera device and a related auto-focusing method capable of actively varying a focal length of a lens of the camera device according to time variation.

2. Description of the Prior Art

A conventional camera device usually has a day mode and a night mode. In the day mode, an infrared optical filter is added on the image sensor of the camera device to prevent the monitor image from color shift affected by infrared ray; and in the night mode, the camera device can receive the infrared ray via removal of the infrared optical filter to increase photosensitivity of the image sensor on the camera device.

Imaging position of the image sensor is effected by refraction of the infrared optical filter, the image sensor can capture the clear monitoring image through the infrared optical filter in the day mode, and the monitoring image is easily defocused in the night mode without usage of the infrared optical filter. The conventional solution is adapted to drive an focusing process of the camera device for acquiring the clear monitoring image; however, the conventional focusing process spends more executive time, the camera device cannot capture the monitoring image while executing the focusing process, which results in a drawback of uncompleted monitoring observation. Thus, design of a monitoring method capable of solving the drawback of uncompleted monitoring observation resulted from the defocused switched between the day mode and the night mode is an important issue in the related industry.

SUMMARY OF THE INVENTION

The present invention provides a camera device and a related auto-focusing method capable of actively varying a focal length of a lens of the camera device according to time variation for solving above drawbacks.

According to the claimed invention, an auto-focusing method is capable of actively varying a focal length of a lens of a camera device according to time variation, and the auto-focusing method is applied to the camera device with the lens. The auto-focusing method includes dividing a capturing period of the camera device into a plurality of time intervals, generating a plurality of sampling values within each of the plurality of time intervals by several focusing process, utilizing the plurality of sampling values to compute a plurality of estimation values corresponding to each of the plurality of time intervals, and driving the camera device to adjust the focal length of the lens of the camera device in accordance with the plurality of estimation values corresponding to the plurality of time intervals and a specific time interval when the camera device is actuated for capture.

According to the claimed invention, a camera device capable of actively varying a focal length of a lens of the camera device according to time variation includes an image sensor and an operation processor. The image sensor is adapted to capture a monitoring image. The operation processor is electrically connected to the image sensor. The operation processor is adapted to divide a capturing period of the camera device into a plurality of time intervals, to generate a plurality of sampling values within each of the plurality of time intervals by several focusing process, to utilize the plurality of sampling values to compute a plurality of estimation values corresponding to the each of the plurality of time intervals, and to drive the camera device to adjust the focal length of the lens of the camera device in accordance with a plurality of estimation values corresponding to the plurality of time intervals and a specific time interval when the camera device is actuated for capture while the monitoring image is blurred or defocused.

The camera device of the present invention can execute the focusing process to acquire the estimation value or the estimation curve about the monitoring area accordingly while being set on the location. As seasons change, environmental illumination may be diverse by weather variation, and the camera device can execute the focusing process because of the seasons change for acquiring the latest estimation value or estimation curve. As an image analyzing function of the camera device determines clarity of the monitoring image is low quality, the focusing process can be actuated accordingly to acquire the latest estimation value or estimation curve, and the camera device can always capture the clear monitoring image for image analysis, such as the vehicle plate recognition.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
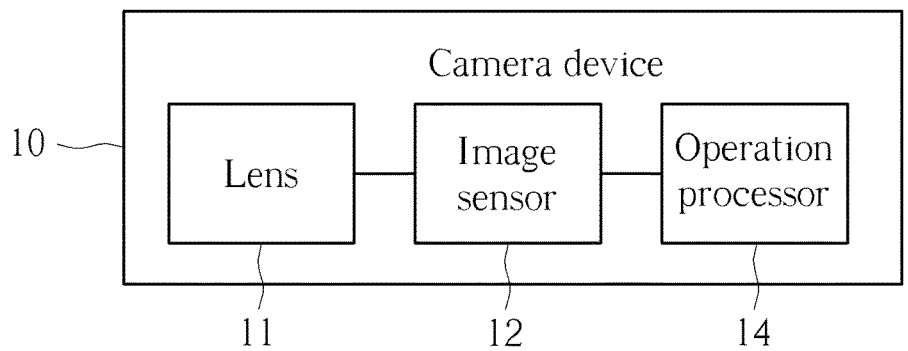
FIG. 1 is a functional block diagram of a camera device according to an embodiment of the present invention.

Please refer to FIG. 1. FIG. 1 is a functional block diagram of a camera device 10 according to an embodiment of the present invention. The camera device 10 includes a lens 11, an image sensor 12 and an operation processor 14 electrically connected with each other. The camera device 10 is located on a predetermined monitoring area, and the image sensor 12 is utilized to capture a monitoring image about the monitoring area. The operation processor 14 can analyze whether the monitoring image is blurred or defocused, and execute focusing process when the blurred monitoring image or the defocused monitoring image is detected, so as to increase clarity of the monitoring image within a time interval T2 (which can be shown in FIG. 3 to FIG. 7). Generally, the camera device 10 can be disposed on the traffic road and may have invisible light supplemental function for night mode. The image sensor 12 is utilized to capture a plate image of the vehicle driven on the traffic road. The operation processor 14 can execute the focusing process under specific condition, so as to adjust a focal length of the lens of the camera device 10 to clearly recognize a pattern of the vehicle plate image.

Figure 2:
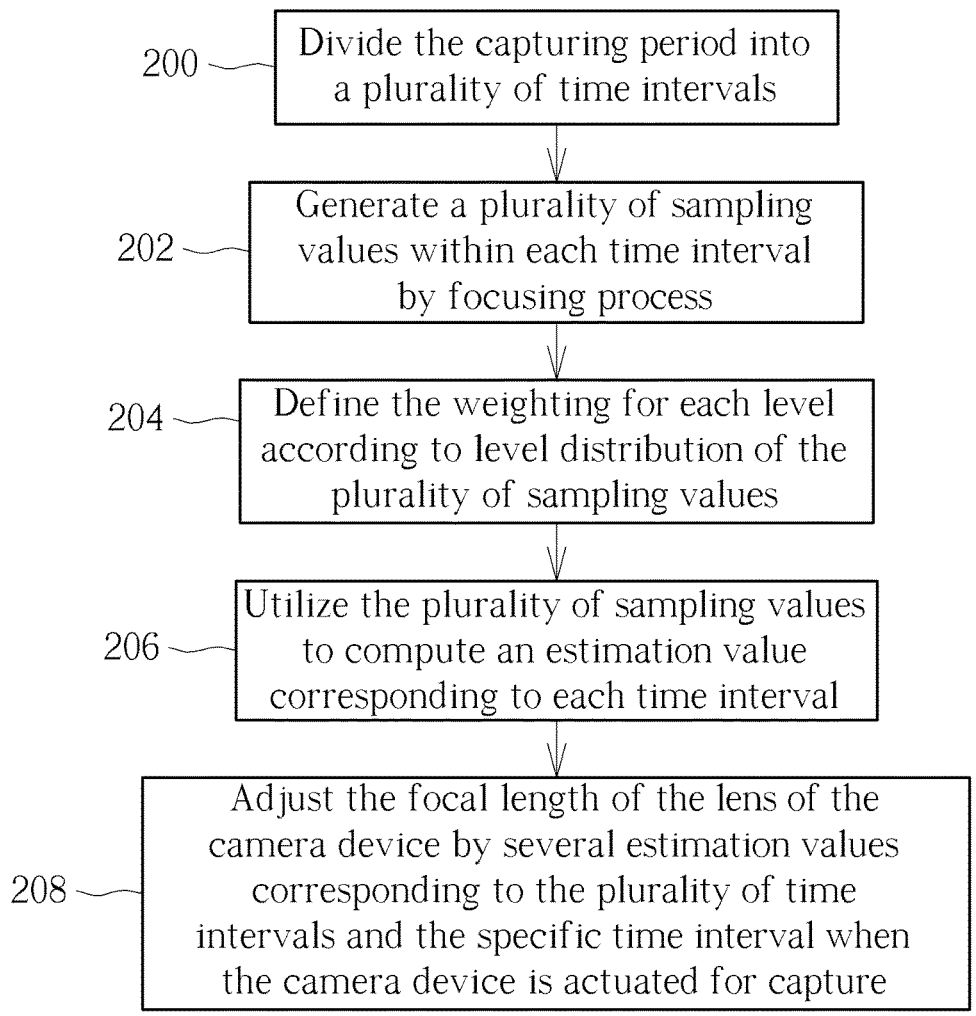
FIG. 2 is a flow chart of an auto-focusing method according to the embodiment of the present invention.
Figure 3:
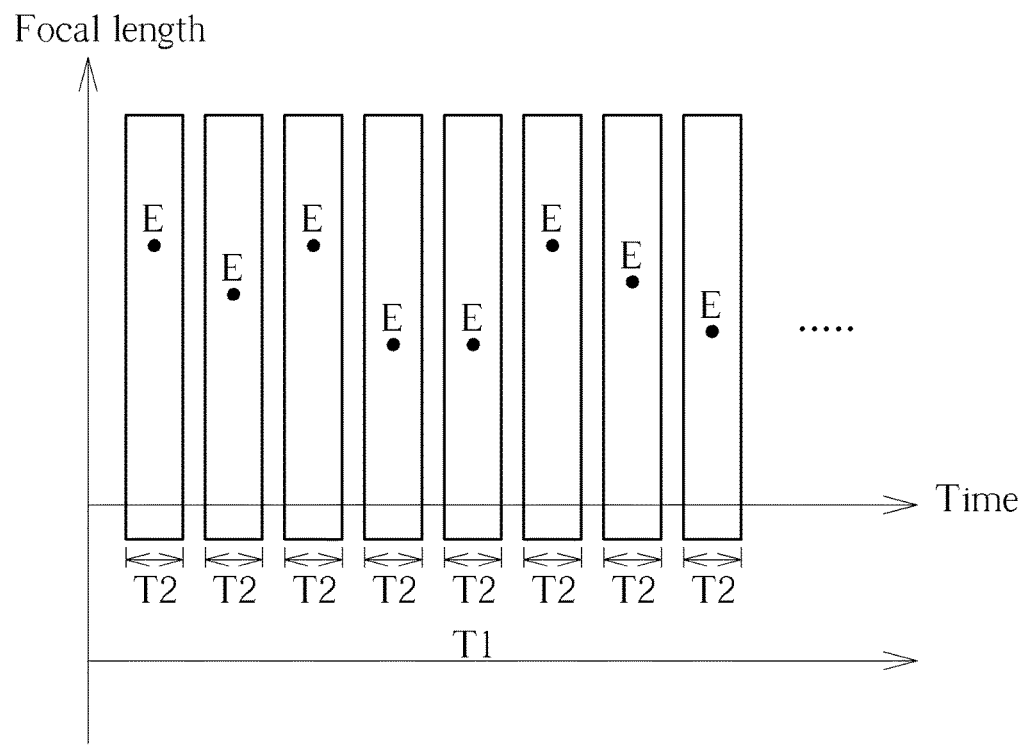
FIG. 3 is a diagram of the focal length actively changed by time variation according to the embodiment of the present invention.
Figure 4:
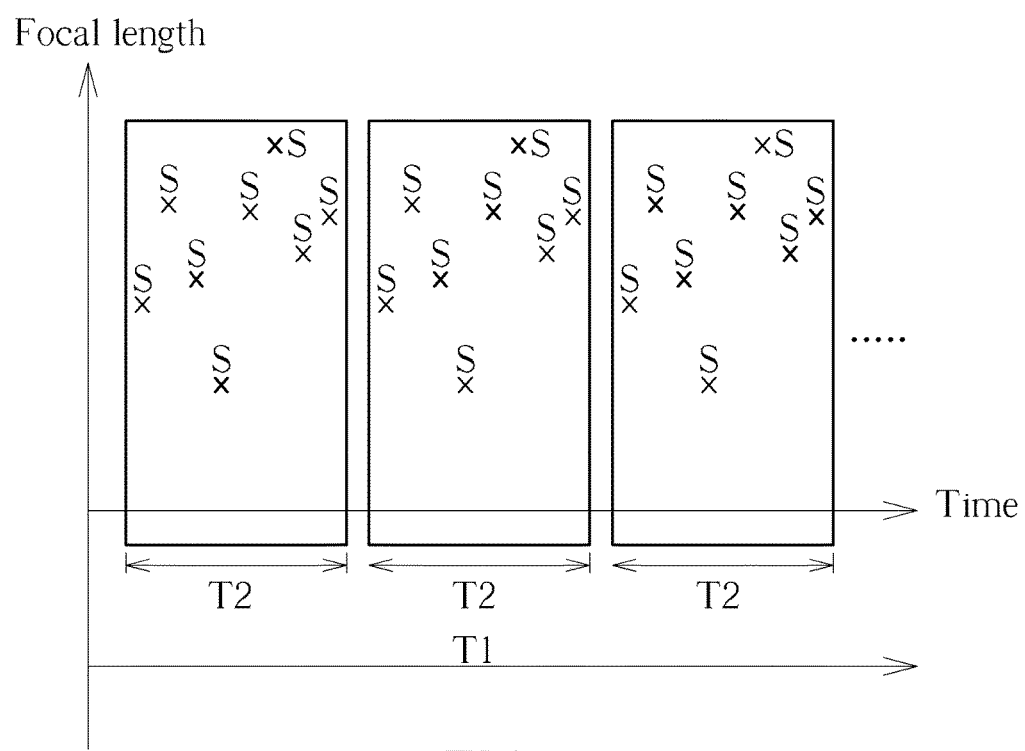
FIG. 4 is a diagram of sampling process executed by the time variation according to the embodiment of the present invention.

Please refer to FIG. 2 to FIG. 4. FIG. 2 is a flow chart of an auto-focusing method according to the embodiment of the present invention. FIG. 3 is a diagram of the focal length actively changed by time variation according to the embodiment of the present invention. FIG. 4 is a diagram of sampling process executed by the time variation according to the embodiment of the present invention. First, step 200 and step 202 are executed that the operation processor 14 can divide a capturing period T1 of the camera device 10 into a plurality of time intervals T2, and a plurality of sampling values S is generated separately within each time interval T2 by the focusing process. The time intervals T2 can be averagely distributed within the capturing period T1, and each time interval T2 has an interval length identical with ones of other time interval T2, as shown in FIG. 3. Further, the interval length of each time interval T2 may be adjusted according to level distribution of the plurality of sampling values S.

For example, the capturing period T1 can be defined as twenty-four hours, and be divided into twenty-four time intervals T2, which means the interval length of each time interval T2 is equal to an hour. As day and night alternately, the invisible light supplemental function of the camera device 10 can be actuated within at least one time interval T2 (such like pm 18:00~19:00), and an invisible optical filter can be out of service at the same time. The sampling value S may have obvious distribution change before and after actuation of the invisible light supplemental function, and further before and after usage of the invisible optical filter. The interval length of the time interval T2 can be varied according to the level distribution of the sampling value S; for example, the time interval T2 (such like pm 18:00~19:00) can be divided into a first time sub-interval (such like pm 18:00~18:30) and a second time sub-interval (such like pm 18:30~19:00) according to usage switch timing of the invisible optical filter. An amount and an interval length of the time sub-interval are not limited to the above-mentioned embodiment, and depend on actual demand.

While the sampling value with sufficient amount is acquired during each time interval T2, step 204 and step 206 are executed that the operation processor 14 can optionally define a corresponding weighting for each level according to the level distribution of the plurality of sampling values S, and then utilize the plurality of sampling values S and the corresponding weightings to compute a plurality of estimation values E corresponding to each time interval T2. As if the auto-focusing method does not define the weighting of each level, the operation processor 14 can directly compute an average of the plurality of sampling values S within each time interval T2 to be the estimation value E; as if the weighting of each level is defined, the auto-focusing method can compute a product of each sampling value S and the corresponding weighting, to compute an average of sum of all product of the plurality of sampling values S and the plurality of corresponding weightings and to define the said average as the estimation value E described in step 206.

In step 204, the auto-focusing method can firstably compute an amount of the sampling values S contained inside each level, compute a totality amount of the plurality of sampling values S, and then divide the amount of the sampling values S contained inside each level by the totality amount of the plurality of sampling values S to acquire a value defined as the corresponding weighting for each level. While the estimation value E corresponding to each time interval T2 is computed by step 206, step 208 is executed that the operation processor 14 can adjust the focal length of the lens of the camera device 10 by several estimation values E corresponding to the plurality of time intervals T2 and a corresponding specific time interval T2 when the camera device 10 is actuated for capture. In the daytime that the invisible light supplemental function is shut down, the camera device 10 can adjust focus parameters in accordance with the estimation value E corresponding to the related time interval T2; in the night that the invisible light supplemental function is actuated and the invisible optical filter is out of service, the focus parameters can be adjusted accordingly to ensure the camera device 10 is able to capture the clear monitoring image any time.

Figure 5:
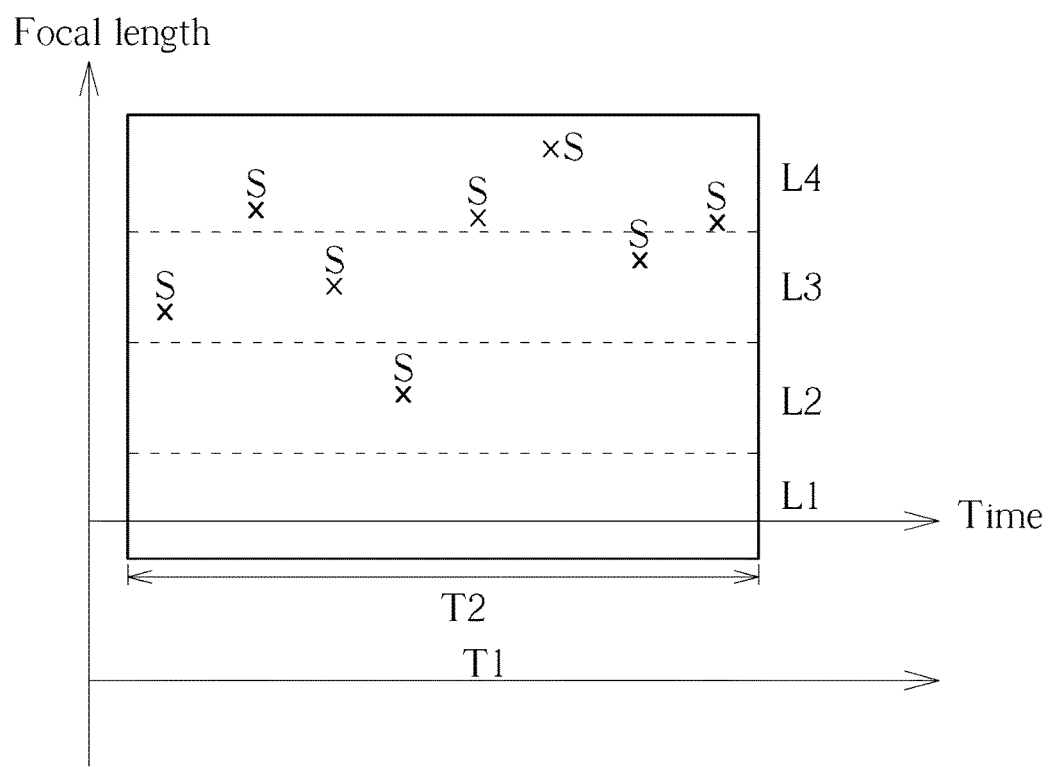
FIG. 5 is a diagram of the level distribution of the sampling value according to the embodiment of the present invention.

Please refer to FIG. 5. FIG. 5 is a diagram of the level distribution of the sampling value S according to the embodiment of the present invention. The auto-focusing method can divide each time interval T2 into several levels; for example, the embodiment shown in FIG. 5 divides the time interval T2 into four levels L1, L2, L3 and L4, and an actual application is not limited to the above-mentioned embodiment. The plurality of sampling values S can be freely distributed inside those levels. As if the level distribution of a particular sampling value S is excessively different from the level distribution of other sampling values S, the particular sampling value S can be considered as noise, and the auto-focusing method may abandon the particular sampling value S and does not define its corresponding weighting. For example, the level L2 has one sampling value, the levels L3 and L4 respectively have at least two sampling values, and the sampling value S inside the level L2 can be considered as noise while number difference is greater than a predetermined threshold (such as two sampling values). The sampling value with overdid deviation is abandoned to increase accuracy of the estimation value E.

Range of the levels L1, L2, L3 and L4 are equal to the variable scope of the sampling value S. Generally, the range of each level is set as a predetermined value, for example, the range of all levels can be identical with each other, or the range of each level can be adaptably varied according to distributed amount of the sampling value S. As shown in FIG. 5, the upper half section of the time interval T2 has a large amount of the sampling value S, and the lower half section of the time interval T2 has a few amount of the sampling value S. The auto-focusing method can define the upper half section (which has the concentrated sampling values S) as a sub-level different from the levels L3 and L4, define the lower half section (which has the sparse sampling values S) as another sub-level different from the level L2, and then define the other section without the sampling value S as a sub-level different from the level L1. Therefore, the auto-focusing method can further define the level range within the time interval T2 according to the distributed number of the sampling value S, so as to compute the accurate and representative estimation value E.

Figure 6:
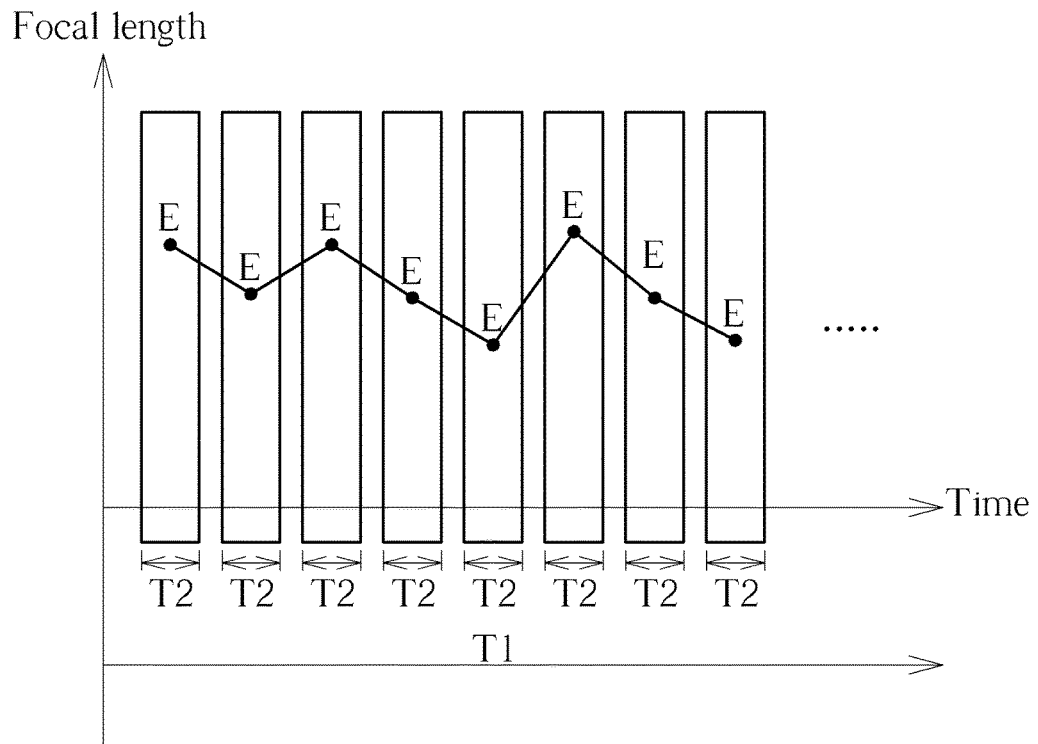
FIG. 6 and FIG. 7 respectively are diagrams of an estimation curve according to different embodiments of the present invention.
Figure 7:
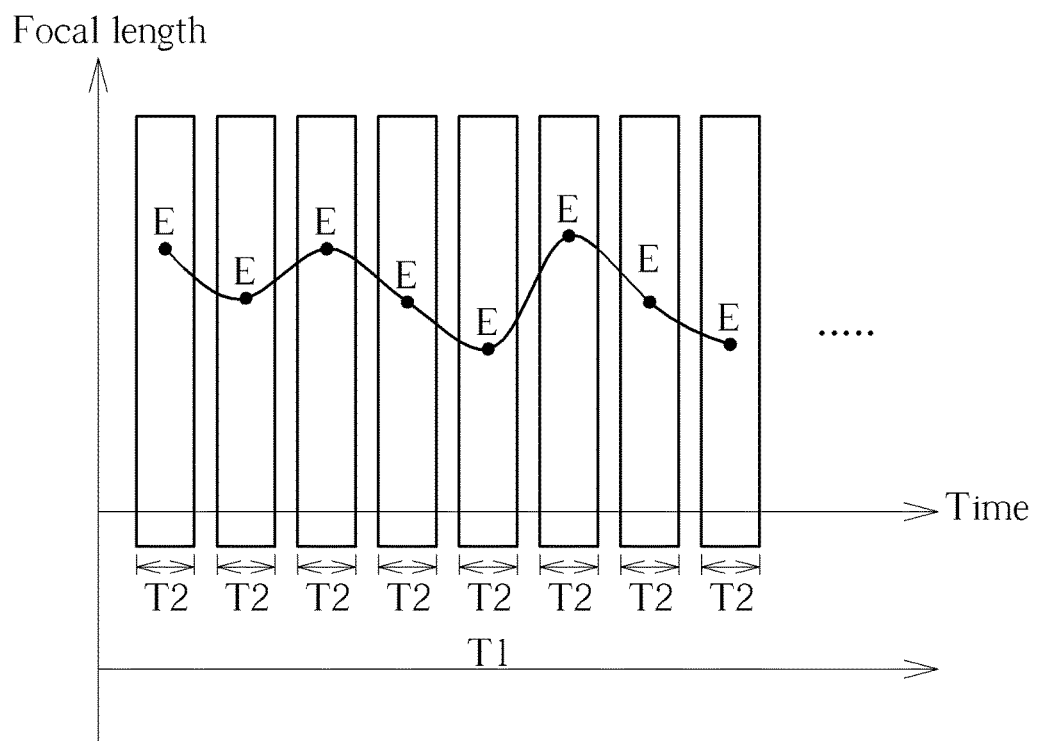

Please refer to FIG. 6 and FIG. 7. FIG. 6 and FIG. 7 respectively are diagrams of an estimation curve according to different embodiments of the present invention. The auto-focusing method can adjust the focal length of the lens of the camera device 10 by various ways while the estimation value E corresponding to each time interval T2 is computed. As shown in FIG. 6, each time interval T2 has the corresponding estimation value E, the auto-focusing method can find out the corresponding time interval T2 within the capturing period T1 in accordance with timing that the camera device 10 is actuated for capture, and then directly adjust the focal length of the lens of the camera device 10 for being equal to the estimation value E corresponding to the corresponding time interval T2, so that the focal length of the lens of the camera device 10 can be the same as the estimation value E any time during the time interval T2. Further, although the estimation curve shown in FIG. 6 is a saw-toothed curve, the plurality of time intervals T2 and the plurality of estimation values E can be gathered to establish a lookup table, and the auto-focusing method executes automatic adjustment of the focal length via the saw-toothed estimation curve or the lookup table.

As shown in FIG. 7, each time interval T2 has one corresponding estimation value E, and the auto-focusing method can utilize a smoothing function to transform the plurality of estimation values E within the capturing period T1 into a smooth estimation curve, which means each point in time of each time interval T2 can be transformed into a related estimation value E. In this embodiment, the focal length can be successively varied according to the smooth estimation curve at any point in time within the time interval T2, and the camera device 10 can adjust the focal length of the lens according to function of the estimation curve and the timing when the camera device 10 is actuated for capture.

Figure 8:
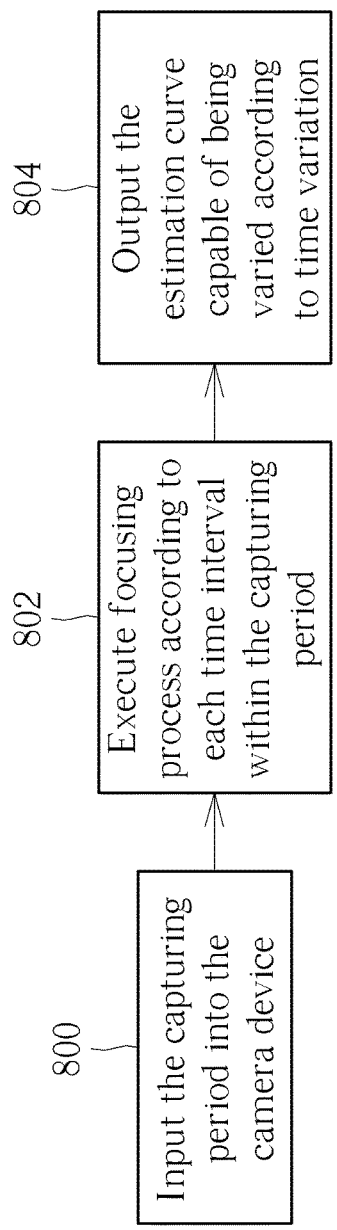
FIG. 8 is a flow chart of learning process executed by the camera device according to the embodiment of the present invention.
Figure 9:
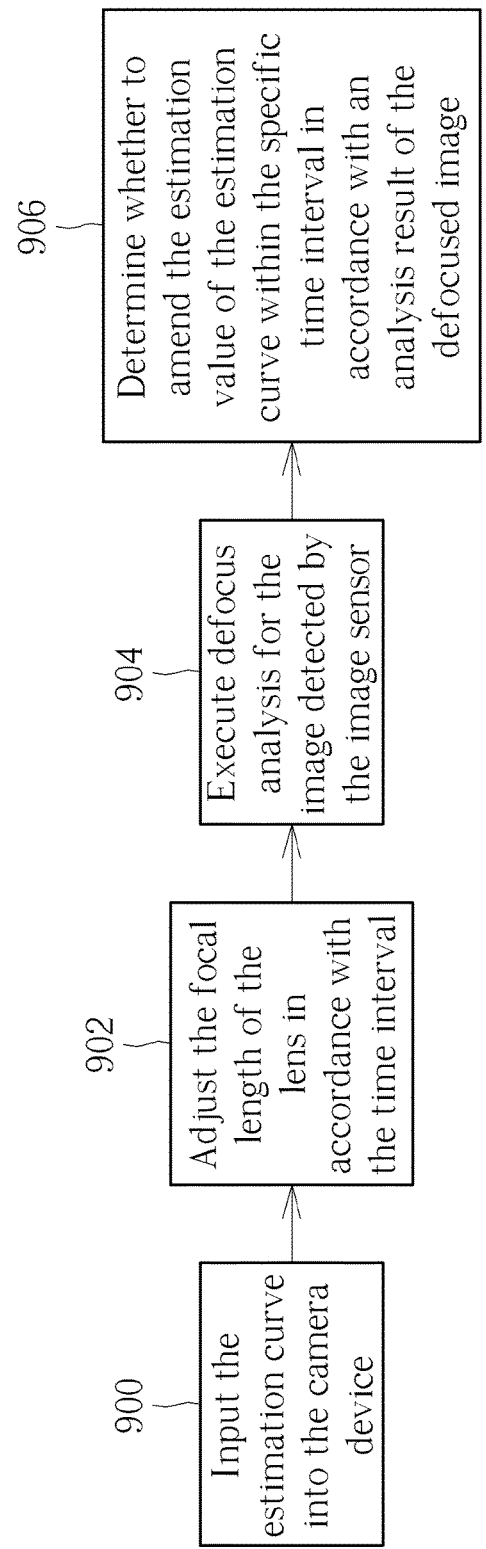
FIG. 9 is a flow chart of amending process executed by the camera device according to the embodiment of the present invention.

Please refer to FIG. 1, FIG. 8 and FIG. 9. FIG. 8 is a flow chart of learning process executed by the camera device 10 according to the embodiment of the present invention. FIG. 9 is a flow chart of amending process executed by the camera device 10 according to the embodiment of the present invention. First, step 800 is executed that a parameter of the capturing period T1 is input into the camera device 10 by the user; generally, the capturing period T1 can be equal to twenty-four hours as a radix number, and an actual application is not limited to the said embodiment. Then, step 802 and step 804 are executed that the camera device 10 can execute the focusing process according to each time interval T2 within the capturing period T1, to find out a estimation value E suitable for each time interval T2 and to output a estimation curve capable of being actively varied according to time variation. While the learning process is completed, step 900 and step 902 are executed that the foresaid estimation curve is set as an input function of the camera device 10, and the camera device 10 can actively adjust the focal length of the lens in accordance with the time interval T2 and the estimation curve of the learning process. Then, step 904 and step 906 are executed that the operation processor 14 can execute defocus analysis for the image detected by the image sensor 12, and determine whether to amend the estimation value of the estimation curve within the specific time interval T2 (as if the image within the said time interval T2 is defocused) in accordance with an analysis result of the defocused image.

In conclusion, the camera device of the present invention can be applied to detect the plate number of the vehicle. The camera device can acquire the clear monitoring image in the daytime, and may be defocused in the night because the invisible light supplemental function is actuated and the invisible optical filter is out of service. The camera device of the present invention executes the auto-focusing method capable of actively varying the focal length of the lens of the camera device according to time variation instead of a conventional focusing process, the focal length of the lens of the camera device can be automatically adjusted according to the estimation value or the estimation curve varied as day and night alternately, so as to effectively decrease running time of the focusing process and to increase monitor comprehensiveness. Moreover, the camera device of the present invention can be a stationary camera or a movable camera (such as the PTZ camera). While the camera device is designed as the movable camera, the movable camera can execute the auto-focusing method of the present invention respectively at several sampling points inside the monitoring area because dissimilar position inside the monitoring area may have dissimilar focusing demand, to ensure the monitoring image can be captured clearly.

The camera device of the present invention can execute the auto-focusing method to acquire the estimation value or the estimation curve about the monitoring area accordingly while being set on the location. As seasons change, environmental illumination may be diverse by weather variation, and the camera device can execute the auto-focusing method of the present invention because of the seasons change for acquiring the latest estimation value or estimation curve. As an image analyzing function of the camera device determines clarity of the monitoring image is low quality, the auto-focusing method of the present invention can be actuated accordingly to acquire the latest estimation value or estimation curve, and the camera device can always capture the clear monitoring image for image analysis, such as the vehicle plate recognition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An auto-focusing method capable of actively varying a focal length of a lens of a camera device according to time variation, the auto-focusing method being applied to the camera device with the lens, the auto-focusing method comprising:
  dividing a capturing period of the camera device into a plurality of time intervals;
  generating a plurality of sampling values within each of the plurality of time intervals by several focusing processes;
  utilizing the plurality of sampling values to compute a plurality of estimation values corresponding to each of the plurality of time intervals; and
  driving the camera device to adjust the focal length of the lens of the camera device in accordance with the plurality of estimation values corresponding to the plurality of time intervals and a specific time interval when the camera device is actuated for capture.

2. The auto-focusing method of claim 1, further comprising:
  defining a corresponding weighting for each level according to level distribution of the plurality of sampling values, wherein each level range of the level distribution is equal to a predetermined value.

3. The auto-focusing method of claim 1, wherein the plurality of time intervals is averagely distributed over the capturing period, and each interval length of the plurality of time intervals are identical with each other.

4. The auto-focusing method of claim 2, wherein an interval length of any of the plurality of time intervals is adjusted according to the level distribution of the plurality of sampling values.

5. The auto-focusing method of claim 2, wherein each level range of the level distribution is adaptably varied according to the plurality of sampling values.

6. The auto-focusing method of claim 2, wherein while a difference between the level distribution of any one of the sampling values belonging to any one of the plurality of time intervals and the level distribution of the other sampling values belonging to the same one of the plurality of time intervals is greater than a threshold, the said sampling value is abandoned, and the corresponding weighting for the said sampling value is not defined.

7. The auto-focusing method of claim 2, wherein defining the corresponding weighting for each level according to the level distribution of the plurality of sampling values comprises:
    computing an amount of the sampling values within each level;
    computing a totality amount of the plurality of sampling values; and
    dividing the amount of the sampling values within each level by the totality amount of the plurality of sampling values to acquire a value defined as the corresponding weighting for each level.

8. The auto-focusing method of claim 2, further comprising:
    computing a product of each sampling value and the corresponding weighting; and
    defining an average of sum of all product of the plurality of sampling values and a plurality of corresponding weightings as the estimation value.

9. The auto-focusing method of claim 1, wherein adjusting the focal length of a lens of the camera device comprises:
    adjusting the focal length of the lens of the camera device equal to the estimation value of the plurality of time intervals corresponding to the specific time interval when the camera device is actuated for capture.

10. The auto-focusing method of claim 1, wherein adjusting the focal length of the lens of the camera device comprises:
    transforming the plurality of estimation values into an estimation curve via a smoothing function; and
    adjusting the focal length of the lens of the camera device according to the estimation curve and the specific time interval when the camera device is actuated for capture.

11. A camera device capable of actively varying a focal length of a lens of the camera device according to time variation, the camera device comprising:
    an image sensor adapted to capture a monitoring image; and
    an operation processor electrically connected to the image sensor, the operation processor being adapted to divide a capturing period of the camera device into a plurality of time intervals, to generate a plurality of sampling values within each of the plurality of time intervals by several focusing processes, to utilize the plurality of sampling values to compute a plurality of estimation values corresponding to the each of the plurality of time intervals, and to drive the camera device to adjust the focal length of the lens of the camera device in accordance with a plurality of estimation values corresponding to the plurality of time intervals and a specific time interval when the camera device is actuated for capture while the monitoring image is blurred or defocused.

12. The camera device of claim 11, wherein the operation processor is further adapted to define a corresponding weighting for each level according to level distribution of the plurality of sampling values, and each level range of the level distribution is equal to a predetermined value.

13. The camera device of claim 11, wherein the plurality of time intervals is averagely distributed over the capturing period, and each interval length of the plurality of time intervals are identical with each other.

14. The camera device of claim 12, wherein an interval length of any of the plurality of time intervals is adjusted according to the level distribution of the plurality of sampling values.

15. The camera device of claim 12, wherein each level range of the level distribution is adaptably varied according to the plurality of sampling values.

16. The camera device of claim 12, wherein while a difference between the level distribution of any one of the sampling values belonging to any one of the plurality of time intervals and the level distribution of the other sampling values belonging to the same one of the plurality of time intervals is greater than a threshold, the said sampling value is abandoned, and the corresponding weighting for the said sampling value is not defined.

17. The camera device of claim 12, wherein the operation processor is further adapted to compute n amount of the sampling values within each level, to compute a totality amount of the plurality of sampling values, and to divide the amount of the sampling values within each level by the totality amount of the plurality of sampling values to acquire a value defined as the corresponding weighting for each level.

18. The camera device of claim 12, wherein the operation processor is further adapted to compute a product of each sampling value and the corresponding weighting, and to define an average of sum of all product of the plurality of sampling values and a plurality of corresponding weightings as the estimation value.

19. The camera device of claim 11, wherein the operation processor is further adapted to adjust the focal length of the lens of the camera device equal to the estimation value of the plurality of time intervals corresponding to the specific time interval when the camera device is actuated for capture.

20. The camera device of claim 11, wherein the operation processor is further adapted to transform the plurality of estimation values into an estimation curve via a smoothing function, and to adjust the focal length of the lens of the camera device according to the estimation curve and the specific time interval when the camera device is actuated for capture.

* * * * *